United States Patent [19]

Gusmer

[11] 4,303,758

[45] Dec. 1, 1981

[54] METHOD OF PREPARING CLOSED CELL PHENOL-ALDEHYDE FOAM AND THE CLOSED CELL FOAM THUS PREPARED

[76] Inventor: Frederick E. Gusmer, 1121 Ocean Ave., Mantoloking, N.J. 08738

[21] Appl. No.: 694,065

[22] Filed: Jun. 7, 1976

[51] Int. Cl.³ .............................................. C08J 9/14
[52] U.S. Cl. .................................. 521/121; 521/131; 521/181
[58] Field of Search ...................... 260/2.5 F

[56] References Cited

U.S. PATENT DOCUMENTS

| | | | |
|---|---|---|---|
| 3,298,973 | 1/1967 | Quarles et al. | 260/2.5 F |
| 3,389,094 | 6/1968 | D'Alesandro | 260/2.5 F |
| 3,484,391 | 12/1969 | Wheatley et al. | 260/2.5 F |
| 3,640,911 | 2/1972 | Papa et al. | 260/2.5 F |
| 3,673,130 | 6/1972 | Papa et al. | 260/2.5 F |
| 3,740,358 | 6/1973 | Christie et al. | 260/2.5 F |

*Primary Examiner*—Morton Foelak
*Attorney, Agent, or Firm*—L. S. Van Landingham, Jr.

[57] ABSTRACT

Closed cell phenol-aldehyde foam is prepared by a method which includes a novel frothing and curing technique. An admixture containing a liquid phenolaldehyde resole resin, a volatile blowing agent, and a surfactant is frothed to produce a stable froth containing closed cells. The cell walls are formed of the liquid resole resin and the closed cells are expanded by the blowing agent in gaseous phase. The froth is formed into an uncured shape and the liquid resole resin is cured to the solid state in the presence of an acid catalyst to produce cured closed cell foam. The internal temperature throughout the shape during curing is above the boiling point of the blowing agent but less than 212° F., and is sufficiently low to prevent further expansion of the shape in an amount to rupture the closed cell walls and thereby form an open cell structure. The liquid resole resin has a sufficiently low exothermic heat of reaction and the acid catalyst is present in an amount whereby the internal temperature of the shape during curing is less than 212° F. and within the aforesaid limits. The improved closed cell foam thus prepared is also provided.

43 Claims, No Drawings

METHOD OF PREPARING CLOSED CELL PHENOL-ALDEHYDE FOAM AND THE CLOSED CELL FOAM THUS PREPARED

THE BACKGROUND OF THE INVENTION

1. The Field of the Invention

This invention broadly relates to the preparation of phenol-aldehyde foam and the foamed products thus prepared. In some of its more specific aspects, the present invention is concerned with the preparation of phenol-aldehyde foam by a method employing a novel frothing technique followed by acid curing of the froth under conditions which produce a closed cell structure in the final solid foamed product. The invention further provides the improved closed cell phenol-aldehyde foam prepared by the method of the invention.

2. The Prior Art

Phenol-aldehyde foam has been prepared for many years by a method which involves the addition of an acid catalyst to a liquid phenol-aldehyde resole resin. Polymerization of the resole resin commences immediately following the addition of the acid catalyst and, inasmuch as the reaction is highly exothermic, the liberated heat rapidly increases the temperature of the reaction mixture. This continuing increase in the reaction temperature progressively increases the rate of polymerization and the reaction proceeds to completion very rapidly. In fact, once initiated, the reaction is generally considered to be impossible to control. The temperature of the reaction mixture increases sufficiently to cause the formation of enough steam from the water originally present in the resole resin and the water of reaction to foam the resin, and the accompanying high reaction temperature causes the initially liquid resole resin to cure to the solid infusible state before the foam collapses. The phenol-aldehyde foam thus prepared has an open cell structure and does not have optimum properties for use as thermal insulation or as a moisture barrier. The foam is also friable and has insufficient strength, flexibility and/or abrasion resistance for use by the construction industry or in engineering applications in general. Open cell phenol-aldehyde foam has a tendency to punk, but in general it has excellent fire resistance and generates only a small amount of smoke when subjected to high temperatures. These latter two properties could be used to great advantage in thermal insulation applications provided the phenol-aldehyde foam also has a high closed cell content and adequate strength.

In recent years, a number of methods have been disclosed in the prior art which are said to produce closed cell phenolic foam. However, such prior art methods have not been commercially successful when using unmodified phenol-formaldehyde resole resins. In all instances, these prior art methods produce foam from phenol-formaldehyde resole resins which have one or more of the deficiencies mentioned hereinbefore, and/or require the use of expensive modifying additives or impractical processing techniques, and/or are not capable of consistently producing high quality closed cell phenol-formaldehyde foam on a commercial scale and on a reproducible basis.

The deficiencies and disadvantages mentioned above have prevented the phenol-aldehyde foams commercially available heretofore from successfully competing with polyurethane foam as thermal insulation in spite of their markedly superior fire resistance and low smoke generation properties. Polyurethane foam has a number of important advantages thereover, including excellent physical and mechanical properties and a high closed cell content, and it may be easily prepared by commercially available methods. These and other properties and advantages have caused polyurethane foam to be used extensively as thermal insulation by the construction and other industries, and in numerous other applications. However, the polyurethane foams are not fire resistant, and they produce a dense and toxic smoke when heated to the point of char. This problem is so pronounced that the use of polyurethane foams as thermal insulation in the construction industry is being strongly discouraged at the present time for safety reasons.

It is apparent from the foregoing that those skilled in the art have long sought an entirely satisfactory and commercially acceptable method of preparing high quality closed cell foam from liquid phenol-aldehyde resole resins on a predictable and reproducible basis. However, such a method was not available prior to the present invention in spite of the great need therefor.

THE SUMMARY OF THE INVENTION AND OBJECTS THEREOF

The present invention overcomes the aforementioned deficiencies and disadvantages of the prior art methods of preparing phenol-aldehyde foam and provides an improved closed cell phenol-aldehyde foam product. This is accomplished by providing a method which includes the novel frothing and curing technique of the invention. An admixture containing a liquid phenol-aldehyde resole resin, a volatile blowing agent and a surfactant is first frothed to produce a stable uncured froth, and the froth is then cured in the presence of an acid catalyst under controlled conditions to be described more fully hereinafter to produce cured closed cell phenol-aldehyde foam.

It is an object of the present invention to prepare phenol-aldehyde foam by a method employing a frothing technique followed by acid curing of the froth under conditions which produce a closed cell structure in the final foamed product.

It is a further object to provide the improved closed cell phenol-aldehyde foam prepared by the method of the invention.

It is still a further object to provide a commercially acceptable method, which includes the novel frothing and curing technique of the invention, for producing high quality closed cell foam on a predictable and reproducible basis from liquid resole resins prepared from phenol per se and formaldehyde.

It is still a further object to provide the improved high quality closed cell foam produced from liquid resole resins prepared from phenol per se and formaldehyde.

Still other objects and advantages of the invention will be apparent to those skilled in the art upon reference to the following detailed description and the specific examples.

THE DETAILED DESCRIPTION OF THE INVENTION INCLUDING THE PREFERRED VARIANTS AND EMBODIMENTS THEREOF

In practicing the present invention, closed cell phenol-aldehyde foam is prepared by frothing an admixture containing a frothable liquid phenol-aldehyde resole resin, a volatile blowing agent for the liquid phenol-aldehyde resole resin, and a surfactant which is a stabilizing agent for the frothed liquid phenol-aldehyde resole resin. A stable uncured froth is produced containing closed cells which have cell walls formed of the liquid resole resin and the closed cells are expanded by the blowing agent in gaseous phase. The uncured froth is shaped into a desired configuration to provide an uncured shape, and the liquid resole resin in the cell walls thereof is then cured to the solid state in the presence of an acid catalyst. The internal temperature throughout the shape during the curing thereof is above the boiling point of the volatile blowing agent but less than 212° F. and the temperature is also sufficiently low to prevent further expansion of the shape in an amount to rupture the closed cell walls and thereby form an open cell structure. The liquid resole resin has a sufficiently low exothermic heat of reaction during curing of the shape whereby the internal temperature throughout the shape is maintained within the aforesaid limits. The acid catalyst is present in an amount to cure the liquid resole resin to the solid state, and is also present in an amount whereby the internal temperature throughout the shape is less than 212° F. and within the aforesaid limits. It will be appreciated that there are certain preferred variants and embodiments of the invention, and that such preferred variants and embodiments will be discussed in greater detail and with greater particularity hereinafter.

Liquid frothable phenol-aldehyde resole resins suitable for practicing the present invention are well known and the general reaction conditions and variables used in the preparation thereof do not comprise a part of this invention. Numerous patents and other publications disclose the preparation of liquid resole resins for foam formulations. Examples of two textbooks relating to the preparation and use of resole resins are *The Chemistry of Phenolic Resins*, by Robert W. Martin, John Wiley and Sons, Inc., New York, N.Y. (1976); and *Plastic Foams*, edited by Kurt C. Frisch, et al, Marcel Dekker, Inc., New York, N.Y. (1973). The disclosures of these two textbooks and the references cited therein are incorporated herein by reference. As a general rule, liquid resole resins are prepared by reacting one or more phenols with one or more aldehydes in aqueous phase and in the presence of an alkaline catalyst. Examples of phenols include phenol per se, resorcinol, cresol, xylenol, chlorophenol, bisphenol-A, alpha-naphthol, beta-naphthol, and admixtures thereof. Aldehydes for reaction with the above phenols usually contain about 1-8 carbon atoms and preferably about 1-3 carbon atoms. Specific examples of aldehydes include formaldehyde, acetaldehyde, propionic aldehyde, furfural, benzaldehyde and admixtures thereof.

The present invention is especially useful in preparing closed cell foam from unmodified frothable liquid resole resins prepared from phenol per se and formaldehyde in one of its commercially available forms. The most common commercially available forms of formaldehyde include formalin, which is usually a 37-45% by weight aqueous solution of formaldehyde in water; paraformaldehyde, which is a solid linear polymer of formaldehyde; and trioxane, which is a solid cyclic tripolymer of formaldehyde. The above and other suitable sources of formaldehyde for reaction with phenol are intended to be embraced herein by the term "formaldehyde."

Examples of alkaline catalysts for use in preparing liquid phenol-aldehyde resole resins include the alkali metal hydroxides, the alkaline earth metal hydroxides and ammonium hydroxide, of which sodium and/or potassium hydroxides are usually preferred. The amount of the alkaline catalyst is in accordance with prior art practice and may be, for example, about 1-5% by weight of the phenol. The pH value of the reaction mixture may be, for example, about 8-10. The reaction may proceed under agitation at a temperature of about 50°-100° C. over a period of, for example, about 1-10 hours. At the end of the reaction period, the reaction mixture is neutralized by addition of a suitable acid such as hydrochloric acid or sulfuric acid to a pH value of approximately 6-7 and is dehydrated under vacuum to remove most of the water and unreacted phenol and/or aldehyde. The water content is reduced to less than 10% by weight and preferably to about 0.05-5% by weight. Usually the best results are obtained when the water content is reduced to the lowest practical weight percent. Excellent foam is produced when the water content is about 0.1-2% by weight, and even better results are obtained with a water content of about 0.2-1.0% by weight. The above stated water contents are as determined by the Karl Fischer method.

The resultant liquid resole resins preferably have a low exothermic heat of reaction, and in many instances may have a low unreacted phenol and/or aldehyde content. The mole ratio of reacted aldehyde to phenol in the resole may vary from slightly over 1.0 to approximately 3.0. The reacted formaldehyde to phenol mole ratio may be, for example, about 1.05:1.0 to 3.0:1.0. In some instances, a stoichiometric mole ratio of aldehyde to phenol of about 1.5:1.0 may give acceptable results, and in still other instances, the mole ratio may be either higher or lower such as about 1.1:1.0 to 1.3:1.0 or about 2.0:1.0 to 3.0:1.0. The resole resin may have, for example, a viscosity of about 20,000-100,000 centipoises at a water content of 1% and at a temperature of 75° F., and preferably about 40,000-60,000 centipoises. Resole resins having a water content between 1.0% and 1.5% by weight usually produce exceptionally good foams within these viscosity ranges. Inasmuch as water of reaction is produced during curing of the shape of froth, it is preferred that the polymerization reaction be advanced as far as practical during the preparation of the liquid resole resin so that a reduced amount of water of reaction is produced during the subsequent curing step. The term "liquid" as used herein in describing the liquid resole resins to be frothed is intended to embrace resole resins in general which are frothable and sufficiently mobile to take the shape of a vessel in which they are stored.

Liquid resole resins which have low exothermic heats of reaction during the later stages of the curing reaction usually give the best results. The liquid resole resin in the closed cell walls of the shape of froth during the curing thereof should have a sufficiently low exothermic heat of reaction whereby the internal temperature throughout the shape is less than 212° F. and sufficiently low to prevent further expansion of the shape in an amount to rupture the cell walls of the closed cells and form an open cell structure. The internal temperature of the curing shape may be much lower than 212° F. if desired, such as less than 200° F. or 180° F., and in some instances may be as low as about 140°-150° F. Prior art resole resins of the type known to have low exothermic heats of reaction are often very useful in practicing the invention such as certain phenolic potting resole resins and laminating resole resins. As is disclosed on Page 152 of the aforementioned textbook entitled *The Chemistry of Phenolic Resins*, besides giving better color, resoles prepared with a formaldehyde to phenol ratio around 2.5:1 show better storage characteristics and are more easily controlled during cure than resins made with a smaller quantity of formaldehyde.

Liquid resole resins which have very satisfactory exothermic heats of reaction may be easily determined by conducting a simple test thereon. In conducting this test, 50 grams of the liquid resole resin having a temperature of 80° F. are placed in an open metal container of a size which results in a $\frac{3}{8}$ inch depth of the resole resin and 2 grams of an acid catalyst composition are vigorously admixed therein with a spatula for 30 seconds. The metal container may be a one half pint tin plated steel can having a diameter of about 2 inches of the type used for paint. The acid catalyst composition contains 1 gram of an acid catalyst sold by Witco Chemical Company under the tradename "Ultra TX Acid", which is said to be toluene xylene sulfonic acid and 1 gram of glycerine, which total the two grams of added catalyst composition. Following addition of the catalyst, the internal temperature of the initially liquid admixture increases to a value not in excess of 150° F. while still a liquid. The initially liquid admixture cures to a solid within about 15 minutes, and the internal temperature of the resultant solid admixture upon further standing does not increase to a value in excess of about 180° F. before decreasing to a lower value and ultimately to room temperature.

Liquid resole resins having exothermic properties which conform with the above test consistently produce superior closed cell foamed products and thus are usually preferred. It is also preferred that the amount of acid catalyst present therein during the curing of the shape of froth be determined as described in greater detail hereinafter in order to insure that the internal temperature throughout the shape during the curing thereof is less than 212° F. and within the aforementioned limits.

The surfactant may be any suitable stabilizing agent for use in stabilizing liquid phenol-aldehyde resole resin froths or foams. A large number of suitable surfactants are known and are disclosed in numerous publications including the two textbooks entitled *The Chemistry of Phenolic Resins* and *Plastic Foams* mentioned hereinbefore and the references cited therein. In general, the preferred stabilizing agents are water soluble and acid stable surface active agents, and for best results they are also non-hydrolyzable. Commonly used surfactants include siloxane-oxyalkylene copolymers such as those disclosed in U.S. Pat. No. 3,271,331, British Pat. No. 1,091,238 and Netherlands Application No. 6,609,096, and the silicones marketed by Union Carbide Corporation and identified as "L-530, L-5310, L-5340 and L-5410." The products of the condensation of ethylene oxide with castor oil and alkyl phenols disclosed in British Pat. No. 1,062,850, and the polyoxyethylene sorbitan fatty acid esters disclosed in U.S. Pat. No. 3,300,419, or the "Tween" series of surfactants marketed by ICI United States Inc. are also very useful. Additional surfactants of the cationic and anionic type are disclosed in U.S. Pat. No. 2,933,461 amd British Pat. No. 586,199, respectively. A proprietary product marketed by Dow Corning Corporation and identified as "DC-193", which is said to be a polyalkyl siloxane-polyoxyalkylene copolymer, is especially useful. Other types of nonionic surfactants are polyethers and polyalcohols, including the condensation products of alkylene oxides, such as ethylene oxide and propylene oxide, with alkyl phenols, fatty acids, alkyl silanes and silicones. Specific examples of additional surfactants include octadecyl phenol-ethylene oxide, decyl phenolethylene oxide sulfate and the low molecular weight polymers, polyoxyethylene dodecyl phenol, octyl phenol polyethylene glycol ether, ricinoleic acid polyethylene glycolate, stearic acid polyoxyethylene glycolates, polyoxyethylene sorbitan monolaurate, polyoxyethylene sorbitan tristearate, polyoxy (propylene-ethylene) sorbitan monolaurate, polyoxyethylene sorbitan pentaoleate, polyoxyethylene sorbitan monopalmitate, and siloxane-oxyalkylene block copolymers such as those containing a Si-O-C-linkage between the siloxane and oxyalkylene moieties and those containing a Si-O-linkage between the siloxane and oxyalkylene moieties. Typical siloxane-oxyalkylene block copolymers contain a siloxane moiety of recurring dimethylsiloxy groups blocked with monomethylsiloxy and/or trimethylsiloxy groups and an oxyalkylene moiety of recurring oxyethylene and/or oxypropylene groups blocked with alkoxy groups. Similarly useful are the sorbitan fatty acid esters such as sorbitan monolaurate, sorbitan monopalmitate, sorbitan monolaurate, sorbitan trioleate and similar esters. These surface active agents usually are employed in the amounts recommended in accordance with prior art practice such as 0.5-5% by weight of the resole resin. Better results often are obtained in using amounts from about 1 to about 3 percent by weight based on the weight of resole resin with best results at about 2 percent by weight. When used in these amounts, the surface active agents aid in nucleation and generation of smaller and more uniform cells and stabilize the froth in general.

Suitable prior art volatile blowing agents for liquid phenol-aldehyde resole resins may be used as the blowing agent component of the admixture to be frothed. The resultant stable uncured froth that is produced upon frothing the admixture contains closed cells which have cell walls formed of the liquid resole resin and the closed cells are expanded by the blowing agent in gaseous phase. Numerous blowing agents suitable for use in frothing techniques of this type are known and are disclosed in the prior art, including the two textbooks mentioned hereinbefore entitled *The Chemistry of Phenolic Resins* and *Plastic Foams* and the references cited therein. Examples of volatile blowing agents include organic compounds such as hydrocarbons, halogenated hydrocarbons, alcohols, ketones and ethers, normally gaseous elemental substances, and normally gaseous inorganic compounds. Specific examples of hydrocarbon blowing agents include methane, ethane, propane, butane, isobutane, cyclobutane, pentane cyclopentane, isopentane, hexane, isohexane and the corresponding unsaturated derivatives thereof which contain one or more carbon-to-carbon double bonds. The halogenated hydrocarbon blowing agents usually contain about 1-3 carbon atoms and have one or more halogen atoms attached directly thereto such as fluorine, chlorine, bromine and/or iodine. Suitable halogenated hydrocarbon blowing agents are sold under the trademark Freon ®, such as Freon 11 and Freon 12. Other halogenated hydrocarbon blowing agents include ethylene chloride, ethyl chloride, monochlorodifluoromethane, dichlorodifluoromethane, 1,2-dichloro-1,1,2,2-tetrafluoroethane, 1,1,1-trichloro-2,2,2-trifluoroethane, 1,2-difluoroethane, and trichloromonofluoromethane. Examples of alcohols include methyl alcohol and ethyl alcohol. Examples of ketones include acetone and methyl ethyl ketone. Examples of ethers include dimethyl ether, methyl ethyl ether, diethyl ether, ethyl propyl ether and dipropyl ether. Examples of elemental gases include argon, helium, nitrogen, neon, krypton, admixtures thereof, and atmospheric air. An example of a normally gaseous inorganic compound is carbon dioxide.

The preferred blowing agents are substantially insoluble in the resole resins, such as the hydrocarbons and halogenated hydrocarbons, and have normal boiling points below 212° F., and preferably below about 150° F. For best results in many instances, it is preferred that the blowing agent have a normal boiling point below about 55° F. or 60° C. The blowing agent may be present in the admixture to be frothed in about the same quantities as employed in the prior art, i.e., in an amount to provide a desired density in the cured foam product. The foam density may be, for example, about 0.2–10 pounds per cubic foot and preferably about 1–3 pounds per cubic foot. The weight percent of blowing agent that is required in the admixture to be frothed to achieve the desired density will vary with the molecular weight of the blowing agent. However, typical weight percentages are about 1–40 parts by weight and preferably about 10–20 parts by weight, based upon the weight of the resole resin. The blowing agent is admixed in the admixture to be frothed following prior art techniques such as by vigorous agitation with a rotary agitator or by the use of special mixing devices such as double worm gear mixers.

Suitable prior art acid catalysts known to be useful for curing liquid phenol-aldehyde resole resins may be employed to cure the initially liquid phenolaldehyde resole resin in the closed cell walls of the froth to the solid state. Numerous acid catalysts of this type are known and are disclosed in the prior art, including the two textbooks mentioned hereinbefore entitled *The Chemistry of Phenolic Resins* and *Plastic Foams* and the references cited therein. Examples of acid catalysts include inorganic acids such as hydrochloric acid, sulfuric acid, nitric acid, and the various phosphoric acids, and organic acids such as aromatic sulfonic acids in general including benzene sulfonic acid, toluene sulfonic acid, xylene sulfonic acid, phenol sulfonic acid and naphthalene sulfonic acid, mono- and poly carboxylic acids such as acetic acid, formic acid, propionic acid, oxalic acid, maelic acid and strong substituted organic acids as trichloroacetic acid. An admixture of toluene sulfonic acid and xylene sulfonic acid is usually preferred. The acid catalyst sold under the trademark "Ultra TX Acid" by Witco Chemical Company, which is said to be anhydrous toluene xylene sulfonic acid is especially preferred. Other acid catalysts of this type are disclosed in U.S. Pat. No. 3,458,449, the disclosure of which is incorporated herein by reference. As is disclosed on Page 152 of the above mentioned textbook entitled "The Chemistry of Phenolic Resins", acid hardening occurs best at relatively low pH values. It is somewhat surprising to find that one-stage phenolic resins are, in general, most stable in the pH range 3–5. Apparently there is a reaction catalyzed by hydrogen ions at a pH below 3 and by hydroxyl ions at higher pH values, starting at a pH of around 5.

The acid catalyst should be present in the shape of uncured froth in an amount to cure the liquid resole resin content to the solid state, and also in an amount whereby the internal temperature throughout the shape during the curing thereof is less than 212° F. and sufficiently low to prevent further expansion of the shape in an amount to rupture the cell walls of the closed cells and form an open cell structure. In general, it is usually preferred to keep the concentration of the acid catalyst as low as possible and yet obtain a satisfactory cure. In most instances, the acid catalyst is added in an amount to reduce the initial pH of the liquid resole resin to an apparent value between about 2.0 and 3.0, and preferably between 2.5 and 3.0 as determined with pH paper. Thus, inasmuch as the acid catalyst is added in an amount to reduce the initial pH of the liquid resole resin to between 2.0 and 3.0, it is apparent in such instances that the initial pH of the liquid resole resin is above 3.0 on at least some occasions. The amount of acid catalyst required to accomplish the reduction in pH will depend upon the initial pH level of the resole resin and the specific acid catalyst that is used. Thus, it is not possible to define the amount of acid catalyst that is added to the resole resin in terms of weight percent based upon the weight of the resole resin with a high degree of accuracy. However, it is usually about 0.5–5% by weight and preferably about 1–3% by weight based upon the resole resin. In most instances, it is preferred that the amount of acid catalyst fall within a weight percent range having upper and lower limits for the specific acid catalyst to be used as determined by the hereinafter described test. The lower limit of the range is that minimum percent by weight of the acid catalyst to be used, based on the weight of the resole resin, that is required to cure the initially liquid resole resin to a solid state within 12 hours when 50 grams of the liquid resole resin having a temperature of 80° F. are placed in an open metal container of a size which results in a depth of the resole resin of ⅜ inch and the acid catalyst is vigorously admixed therein with a spatula for 30 seconds. The upper limit of the aforementioned range is that weight percent of the acid catalyst to be used that is required to produce an increase in the internal temperature of the resole resin, while a liquid, to a value of 150° F. and to form a solid therefrom within about 15 minutes when 50 grams of the initially liquid resole resin having a temperature of 80° F. are placed in an open metal container of a size which results in a depth of the resole resin of ⅜ inch and the acid catalyst is admixed vigorously therewith with a spatula for 30 seconds and gently agitated thereafter until the solid phase is closely approached, thereafter, the internal temperature of the solid phase thus produced does not increase to a value in excess of 180° F. before decreasing to a lower value and ultimately to an ambient temperature. The metal container that is used in the above test is preferably of the same size and construction as described previously.

The admixture to be frothed should be substantially uniform in composition in order to achieve the best possible results. Usually, the surfactant is admixed with the liquid resole resin and the blowing agent is admixed therewith to produce the mixture to be frothed. In instances where the blowing agent has a boiling point below the temperature of the mixture to be frothed, then the mixture must be under a superatmospheric pressure which is sufficiently high to maintain the blowing agent in liquid phase. The admixture under superatmospheric pressure may be frothed by quickly releasing the pressure thereon to rapidly volatilize the blowing agent and thereby produce an uncured froth of liquid resole resin without requiring heat from the subsequent exothermic curing step to effect the frothing.

In instances where the blowing agent has a boiling point above the temperature of the admixture to be frothed, it is necessary to externally heat the admixture above the boiling point and thereby volatilize the blowing agent and produce an uncured froth of liquid resole resin without requiring heat from the subsequent exothermic curing step. In practicing this variant of the invention, it is necessary to externally heat the admixture throughout its volume to a temperature which is sufficiently above the boiling point of the blowing agent to effect the frothing step. Where heat by radiation, convection, or conduction is not sufficiently rapid to effectively froth the admixture throughout its cross section due to the creation of a self-insulating effect by the formation of cells within the admixture, this heating step can be accomplished by means of microwave radiation. Thus, the use of microwave radiation in accomplishing the heating of the resole resin and/or the frothing step in instances where the boiling point of the blowing agent is above the temperature of the admixture to be frothed is a unique variant of the present invention.

When desired, the acid catalyst may be admixed with the uncured froth subsequent to the frothing step and prior to curing the uncured shapes. This may be done in either of the two methods of frothing the admixture. However, it is usually preferred to admix the acid catalyst with the remaining ingredients of the admixture immediately prior to frothing. In such instances, the uncured froth contains the acid catalyst substantially uniformly distributed therein prior to shaping the uncured shape and curing the same.

Regardless of the method of adding the acid catalyst to the remaining ingredients, it should be substantially uniformly distributed therein so as to avoid hot spots and localized reaction temperatures above 212° F. during the curing of the shape. The method that is employed in admixing the various ingredients is not critical, but it should be efficient and should result in a substantially uniform admixture thereof at the time of frothing and/or curing the shape of froth. Commonly employed methods of admixing include the rapidly rotating beater or propeller type agitators of the prior art. The preferred mixing device is a double worm gear mixer having right and left hand threads which are driven at high speeds such as 1200–1800 revolutions per minute. This provides a continuous mixing method which is easily adaptable to either individual castings of shapes of froth or continuous board stock production.

In instances where shaping the froth or forming a shape, i.e. a preform of the froth for curing is referred to, it is understood that this may be done in any desired manner. For instance, the uncured froth may be placed in a mold to form the shape or preform to be cured, or merely allowed to take the shape of the vessel in which the froth is initially formed. The uncured froth also may be sprayed or extruded onto a surface to thereby form the shape of froth to be cured. Thus, the step of shaping the froth to form a shape or preform for curing is intended to be given a broad interpretation and to embrace shapes or preforms having a definite configuration as well as free formed shapes or preforms.

The foregoing detailed description and the following specific examples are for purposes of illustration only, and are not intended as being limiting to the spirit or scope of the appended claims.

EXAMPLE I

The liquid phenol-formaldehyde resole resin employed in this example had a water content of 1.1% as determined by the Karl Fischer method and a viscosity at ambient temperature of 50,000 centipoises. The specific gravity was 1.257.

Fifty grams of the liquid resole resin was cooled to 50° F. in an open top metal container, and 1 gram of a surfactant sold by Union Carbide Corporation under the tradename Silicone L-5410 was admixed therein by stirring vigorously with a spatula. Thereafter, 4 grams of ethyl chloride as a blowing agent was admixed therein by vigorously stirring with the spatula, followed by 2 grams of a catalyst composition containing one part by weight of Ultra TX Acid and one part by weight of glycerine.

The admixture was transferred to a paper container and placed in a microwave oven having a rating of 425 watts RF (radio frequency) for a period of 10 seconds. The temperature of the admixture rose to approximately 140° F. and it was frothed at the end of the 10 second heating period. The frothed admixture was then placed in an air oven having a temperature of 140° F. for one-half hour to complete the curing step.

The cured phenol-formaldehyde foam thus prepared was tested to determine the open cell content by means of a pycnometer. The closed cell content was above 90%. The density of the cured foam was 1.7 pounds per cubic foot.

EXAMPLE II

The liquid phenol-formaldehyde resole resin employed in this example contained 1.5% of water and the viscosity was 48,000 centipoises at ambient temperature. The pH value was 5.0. The liquid resole resin was frothed on a continuous basis by means of a double worm gear mixer having right and left hand threads driven at a speed of 1200 to 1800 revolutions per minute. The liquid resole resin containing 2% by weight of Dow Corning DC-193 surfactant was delivered from a first gear pump at the rate of 156 grams per minute and was fed to a second gear pump having an increased speed which delivered 20 parts per hundred more material than the first gear pump. Freon 12 as the blowing agent was bled into the line between the two pumps in liquid form, and the discharge from the second pump, which contained the liquid resole resin, surfactant and blowing agent, was fed directly to the double worm gear mixer. A catalyst composition containing one part by weight of Ultra TX acid and one part by weight of glycerine was uniformly admixed in the ingredients passing through the worm gear mixer at a rate of 4 grams per minute. Immediately before discharge from the worm gear mixer, the admixture to be frothed was under a pressure of 200 pounds per square inch and the temperature thereof was 120° F.

Upon discharge from the worm gear mixer, the admixture frothed immediately and formed a stable uncured froth. The uncured froth was collected in a container and placed in an oven at 140° F. where it cured to the solid state within one hour. The foam density was 1.8 pounds per cubic foot. Upon testing by means of a pycnometer, the closed cell content was above 90%.

The method of the invention is capable of producing phenol-aldehyde foam on a reproducible basis which has substantially all closed cells. The closed cell content is consistently about 90%, and usually is above 95%. In many instances, the closed cell content appears to be substantially 100%.

As a general rule, it is often preferred that the frothing step be performed quickly and sometimes within the minimum practical period of time. For example, when the blowing agent has a boiling point below the temperature of the admixture to be frothed and the admixture is under a superatmospheric pressure which is sufficiently high to maintain the blowing agent in liquid phase, then the admixture may be extruded through an orifice to thereby quickly reduce the pressure on the system. In such instances, the pressure may be reduced to approximately ambient pressure substantially instantaneously and the admixture is likewise frothed substantially instantaneously. In still other instances, the pressure on the system may be quickly reduced over a short but measurable period of time such as about 0.1 to 10 seconds to thereby effect the frothing of the admixture. The superatmospheric pressure on the system must be sufficient to maintain liquid phase conditions, but it may be much higher when desired. The pressure may be, for example, about 10 to 1,000 psi above the minimum pressure required to maintain liquid phase conditions, and also is preferably 100 to 200 psi above the ambient pressure.

It has also been found that frothing may be accomplished by injecting and retaining the blowing agent in gaseous form and creating the admixture under high shear conditions. By using pressures, for example, of 2,000 or higher, or preferably 1,000 psi or lower within the mixing device, reduction of the volumetric displacement of the gas within the liquid carrier comprised substantially of resole resin permits the formation of an admixture emulsion capable of producing a froth upon being reduced to ambient pressure, such reduction following the same general rule mentioned above as applied to liquid blowing agents having boiling points below the temperature of the admixture.

When the boiling point of the blowing agent is above the temperature of the admixture, then the admixture may be quickly heated throughout to a temperature above the boiling point over a short but measurable period of time. The admixture may be quickly heated by microwave radiation over a period of, for example, about 1 to 20 seconds and preferably 8 to 12 seconds, to thereby quickly vaporize the blowing agent and froth the admixture. Following the frothing step in either instance, it is necessary that the froth and the shape to be cured that is formed therefrom be maintained at a temperature above the boiling point of the blowing agent until the shape is cured.

I claim:

1. A method of preparing cured closed cell phenol-aldehyde foam consisting essentially of the steps of frothing an admixture consisting essentially of (1) a frothable liquid phenol-aldehyde resole resin which consists essentially of the said aldehyde interpolymerized with the said phenol in a mole ratio of 2.0:1 to 3.0:1 under aqueous liquid phase conditions in the presence of an alkaline catalyst, the said liquid phenol-aldehyde resole resin initially having a pH above 3 as produced and also having a low exothermic heat of reaction upon curing to the solid state at a pH below 3 in the presence of an acid catalyst whereby when 50 grams thereof having a pH of about 5 and temperature of 80° F. are placed in an open metal container of a size which results in a depth of the liquid resole resin of ⅝ inch and about 2 grams of an acid catalyst composition are vigorously admixed therein with a spatula for 30 seconds, the acid catalyst composition containing one gram of toluene xylene sulfonic acid and one gram of glycerin and being present in an amount to provide a pH value below 3, then the internal temperature of the admixture while a liquid increases to a value not in excess of about 150° F., the initially liquid admixture forms a solid within about 15 minutes, and the internal temperature of the said solid upon standing does not increase to a value in excess of about 180° F. before decreasing to a lower value, (2) a volatile blowing agent for the said liquid phenol-aldehyde resole resin, and (3) a surfactant which is a stabilizing agent for frothed liquid phenol-aldehyde resole resin to produce a stable uncured froth of the said liquid phenol-aldehyde resole resin, the said uncured froth containing closed cells which have cell walls formed of the liquid phenol-aldehyde resole resin and the said closed cells being expanded by the volatile blowing agent in gaseous phase, shaping the said uncured froth into a desired configuration to provide an uncured preform, curing the liquid phenol-aldehyde resole resin in the cell walls of the said uncured preform to the solid state at a pH below 3 in the presence of a catalytically effective amount of an acid catalyst which promotes the curing of the liquid phenolaldehyde resole resin to produce cured closed cell phenolaldehyde foam, and maintaining the temperature throughout the interior of the said uncured preform during the curing thereof above the boiling point of the volatile blowing agent but less than 212° F. and at a temperature sufficiently low to prevent further expansion of the said uncured preform in an amount to rupture the said cell walls of the closed cells and form an open cell structure, the liquid phenol-aldehyde resole resin in the said uncured preform having a sufficiently low exothermic heat of reaction in the presence of the said amount of acid catalyst whereby the temperature throughout the interior of the said uncured preform may be maintained below 212° F., and the said acid catalyst being present in the said uncured preform in an amount effective to provide a pH below 3 and promote the curing of the liquid phenol-aldehyde resole resin to the solid state and also present in a limited amount whereby the temperature throughout the interior of the said uncured preform during the curing thereof may be maintained below 212° F.

2. The method of claim 1 wherein the volatile blowing agent has a boiling point below the temperature of the said admixture and the admixture is under a superatmospheric pressure which is sufficiently high to maintain the blowing agent in the liquid phase, and the admixture is frothed by quickly releasing the pressure thereon to rapidly volatilize the blowing agent and thereby produce the said uncured froth of the liquid resole resin without requiring heat produced by the exothermic reaction.

3. The method of claim 2 wherein the acid catalyst is admixed with the said uncured froth subsequent to the frothing step and prior to curing the said uncured preform.

4. The method of claim 2 wherein the said acid catalyst is admixed in the said admixture prior to frothing and the said uncured froth contains the acid catalyst subtantially uniformly distributed therein prior to shaping into the said uncured preform.

5. The method of claim 1 wherein the volatile blowing agent has a boiling point above the initial temperature of the said admixture to be frothed, and the admixture is frothed by quickly heating above the boiling point of the blowing agent and thereby rapidly volatilizing the blowing agent to produce the said uncured froth of the liquid resole resin without requiring heat from the exothermic reaction, the admixture being rapidly heated throughout its volume to a temperature above the boiling point of the blowing agent by means of microwave radiation.

6. The method of claim 5 wherein the acid catalyst is admixed with the said uncured froth subsequent to the frothing step and prior to curing the said uncured preform.

7. The method of claim 5 wherein the acid catalyst is admixed in the said admixture prior to frothing and the said uncured froth contains the acid catalyst substantially uniformly distributed therein prior to shaping the said uncured preform.

8. The method of claim 1 wherein the acid catalyst is present in the said uncured preform in an amount to provide a pH value between about 2.0 and 3.0.

9. The method of claim 1 wherein the water content of the liquid resole resin is less than 5% by weight.

10. The method of claim 1 wherein the viscosity of the liquid resole resin is about 20,000–100,000 centipoises at a water content of 1% by weight and a temperature of 75° F.

11. The method of claim 1 wherein the liquid resole resin is prepared from phenol per se and formaldehyde.

12. The method of claim 11 wherein the water content of the liquid resole resin is less than 5% by weight.

13. The method of claim 11 wherein the viscosity of the liquid resole resin is about 20,000–100,000 centipoises at a water content of 1% by weight and a temperature of 75° F.

14. The method of claim 11 wherein the said solid upon standing does not increase value in excess of about 180° F. before decreasing the acid catalyst is present in the said uncured preform in an amount to provide a pH value between about 2.0 and 3.0.

15. The method of claim 14 wherein the water content of the liquid resole resin is less than 2% by weight.

16. The method of claim 15 wherein the viscosity of the liquid resole resin is about 40,000–60,000 centipoises at a water content of 1% by weight and a temperature of 75° F.

17. The method of claim 16 wherein the volatile blowing agent has a boiling point below the temperature of the said admixture and the admixture is under a superatmospheric pressure which is sufficiently high to maintain the blowing agent in the liquid phase, and the admixture is frothed by quickly releasing the pressure thereon to rapidly volatilize the blowing agent and thereby produce the said uncured froth of the liquid resole resin without requiring heat produced by the exothermic reaction.

18. The method of claim 16 wherein the liquid phenol-aldehyde resole resin in the said admixture has a mole ratio of interpolymerized formaldehyde to phenol per se of about 2.5:1 and the volatile blowing agent has a boiling point above the initial temperature of the said admixture to be frothed, and the admixture is frothed by quickly heating above the boiling point of the blowing agent and thereby rapidly volatilizing the blowing agent to produce the said uncured froth of the liquid resole resin without requiring heat from the exothermic reaction, the admixture being rapidly heated throughout its volume to a temperature above the boiling point of the blowing agent by means of microwave radiation.

19. The method of claim 1 wherein the internal temperature of the curing preform is not greater than about 150° F.

20. The method of claim 1 wherein the cured closed cell phenol-aldehyde foam has a density of about 1–3 pounds per cubic foot.

21. The method of claim 20 wherein the cured closed cell phenol-aldehyde foam contains at least 95% of closed cells.

22. The method of claim 1 wherein the acid catalyst is present in the said uncured preform in an amount to provide a pH value between about 2.0 and 3.0, the liquid resole resin is prepared from phenol per se and formaldehyde, the water content is less than 2% by weight, and the viscosity is about 40,000–60,000 centipoises at a water content of 1% by weight and a temperature of 75° F.

23. The method of claim 22 wherein the mole ratio of interpolymerized formaldehyde to phenol per se is about 2.5:1, the acid catalyst is present in the said uncured preform in an amount to provide a pH value between 2.5 and 3.0, the liquid phenol-aldehyde resin in the said uncured preform has a sufficiently low exothermic heat of reaction in the presence of the said catalytically effective amount of the catalyst whereby the temperature throughout the interior of the said uncured preform does not substantially increase due to the exothermic heat of reaction during the curing thereof, and the cured closed cell phenol-formaldehyde foam has a density of about 1–3 pounds per cubic foot and substantially all of the cells are closed cells.

24. A method of preparing cured closed cell phenol-aldehyde foam consisting essentially of the steps of preparing a stable uncured closed cell froth of liquid phenol-aldehyde resole resin by frothing an admixture consisting essentially of (1). A frothable liquid phenol-aldehyde resole resin which consists essentially of the said aldehyde interpolymerized with the said phenol in a mole ratio of 2.0:10 to 3.0:1.0 under aqueous liquid phase conditions in the presence of an alkaline catalyst, the said liquid phenol-aldehyde resole resin initially having a pH above 3 as produced and also having a water content of less than 5% by weight and a viscosity of about 20,000–100,000 centipoises at a water content of 1% by weight and a temperature of 75° F., the said liquid phenol-aldehyde resole resin being further characterized by a low exothermic heat of reaction whereby when 50 grams thereof having a pH of about 5 and a temperature of 80° F. are placed in an open metal container of a size which results in a depth of the liquid resole resin of ⅜ inch and about 2 grams of an acid catalyst composition are vigorously admixed therein with a spatula for 30 seconds, the acid catalyst composition being present in an amount to provide a pH value below 3 and containing one gram of toluene xylene sulfonic acid and one gram of glycerin, then the internal temperature of the admixture while a liquid increases to a value not in excess of about 150° F., the initially liquid admixture forms a solid within about 15 minutes, and the internal temperature of the said solid upon standing does not increase to a value in excess of about 180° F. before decreasing to a lower value;

(2) a volatile non-aqueous blowing agent for the said liquid phenol-aldehyde resole resin having a boiling point at atmospheric pressure of less than 212° F.; and (3) a surfactant which is a stabilizing agent for frothed liquid phenol-aldehyde resole resin; the said uncured froth containing at least 90% of closed cells which have cell walls formed of the liquid phenol-aldehyde resole resin and the said closed cells being expanded by the volatile blowing agent in gaseous phase, shaping the said uncured froth into a desired configuration to provide an uncured preform thereof which likewise contains at least 90% of closed cells having cell walls formed of the liquid phenol-aldehyde resole resin, thereafter curing the liquid phenol-aldehyde resole resin in the cell walls of the said uncured preform to the solid state at a pH below 3 in the presence of a catalytically effective amount of an acid catalyst which promotes the curing of the liquid phenol-aldehyde resole resin to produce cured solid phenol-aldehyde foam containing at least 90% of closed cells, and maintaining the temperature throughout the interior of the said uncured preform during the curing thereof above the boiling point of the volatile blowing agent but less than 212° F. and at a temperature sufficiently low to prevent further expansion of the said uncured preform in an amount to rupture the said cell walls of the closed cells and form an open cell structure, the liquid phenol-aldehyde resole resin in the said uncured preform having a sufficiently low exothermic heat of reaction in the presence of the said acid catalyst whereby the temperature throughout the interior of the said uncured preform may be maintained below 212° F., and the said acid catalyst being present in the said uncured preform in an amount effective to provide a pH below 3 and promote the curing of the liquid phenol-aldehyde resole resin to the solid state and also present in a limited amount whereby the temperature throughout the interior of the said uncured preform may be maintained below 212° F.

25. The method of claim 1 wherein the interior of the said uncured preform is maintained at a temperature not in excess of 180° F. during the curing thereof.

26. The method of claim 1 wherein the interior of the said uncured preform is maintained at a temperature not in excess of 150° F. during the curing thereof.

27. The method of claim 1 wherein the liquid phenol-aldehyde resin in the said uncured preform has a sufficiently low exothermic heat of reaction in the presence of the said catalytically effective amount of the catalyst whereby the temperature throughout the interior of the said uncured preform does not substantially increase due to the exothermic heat of reaction during the curing thereof.

28. The method of claim 24 wherein the interior of the said uncured preform is maintained at a temperature not in excess of 180° F. during the curing thereof.

29. The method of claim 24 wherein the liquid phenol-aldehyde resin in the said uncured preform has a sufficiently low exothermic heat of reaction in the presence of the said catalytically effective amount of the catalyst whereby the temperature throughout the interior of the said uncured preform does not substantially increase due to the exothermic heat of reaction during the curing thereof.

30. A method of preparing cured closed cell phenol-aldehyde foam consisting essentially of the steps of preparing an admixture consisting essentially of (1) a frothable liquid phenol-aldehyde resole resin which consists essentially of the said aldehyde interpolymerized with the said phenol in a mole ratio of 2.0:1.0 to 3.0:1.0 under aqueous liquid phase conditions in the presence of an alkaline catalyst, the said liquid phenol-aldehyde resole resin having initially a pH above 3 as produced and also having a low exothermic heat of reaction upon curing to the solid state at a pH below 3 in the presence of an acid catalyst whereby when 50 grams thereof having a pH of about 5 and temperature of 80° F. are placed in an open metal container of a size which results in a depth of the liquid resole resin of ⅜ inch and about 2 grams of an acid catalyst composition are vigorously admixed therein with a spatula for 30 seconds, the acid catalyst composition containing one gram of toluene xylene sulfonic acid and one gram of glycerin and being present in an amount to provide a pH value below 3, then the internal temperature of the admixture while a liquid increases to a value not in excess of about 150° F., the initially liquid admixture forms a solid within about 15 minutes, and the internal temperature of the said solid upon standing does not increase to a value in excess of about 180° F. before decreasing to a lower value, (2) a volatile blowing agent for the said liquid phenol-aldehyde resole resin, (3) a surfactant which is a stabilizing agent for frothed liquid phenol-aldehyde resole resin, and (4) a catalytically effective amount of an acid catalyst which promotes the curing of the said liquid phenol-aldehyde resin, frothing the admixture to produce a stable uncured froth of the liquid phenol-aldehyde resole resin, the said uncured froth as produced being at a temperature below 212° F. and below the effective minimum curing temperature therefor and having an exothermic heat of reaction which is sufficiently low to prevent the froth from reaching the said minimum curing temperature in the absence of heat supplied by an outside source, the said uncured froth containing closed cells which have cell walls formed of the liquid phenol-aldehyde resole resin and the said closed cells being expanded by the volatile blowing agent in gaseous phase, shaping the said uncured froth into a desired configuration to provide an uncured preform, heating the said uncured preform to an effective curing temperature above the boiling point of the volatile blowing agent but less than 212° F., curing the liquid phenol-aldehyde resole resin in the cell walls of the said uncured preform to the solid state at a pH below 3, the said uncured preform being heated with heat supplied from an outside source and to a temperature sufficiently low to prevent further expansion of the said uncured preform in an amount to rupture the said cell walls and form an open cell structure, and maintaining the temperature throughout the interior of the said uncured preform during the curing thereof above the boiling point of the volatile blowing agent but less than 212° F. and at a temperature sufficiently low to prevent further expansion of the said uncured preform in an amount to rupture the said cell walls of the closed cells and form an open cell structure to thereby produce cured closed cell phenol-aldehyde foam, the liquid phenol-aldehyde resole resin in the said uncured preform during the curing thereof to the solid state having a sufficiently low exothermic heat of reaction in the presence of the said acid catalyst whereby the temperature throughout the interior of the said uncured preform may be maintained below 212° F.

31. The method of claim 30 wherein the said uncured preform is heated to a temperature not in excess of 180° F. and is thereafter maintained at a temperature not in excess of 180° F. throughout the interior during the curing thereof.

32. The method of claim 30 wherein the said uncured preform is heated to a temperature not in excess of 150° F. and is thereafter maintained at a temperature not in excess of 150° F. throughout the interior during the curing thereof.

33. The method of claim 30 wherein the water content of the liquid resole resin is less than 5% by weight.

34. The method of claim 30 wherein the viscosity of the liquid resole resin is about 20,000–100,000 centipoises at a water content of 1% by weight and a temperature of 75° F.

35. The method of claim 30 wherein the volatile blowing agent has a boiling point below the temperature of the said admixture and the admixture is under a superatmospheric pressure which is sufficiently high to maintain the blowing agent in the liquid phase, and the admixture is frothed by quickly releasing the pressure thereon to rapidly volatilize the blowing agent and thereby produce the said uncured froth of the liquid resole resin without requiring heat produced by the exothermic reaction.

36. The method of claim 30 wherein the liquid phenol-aldehyde resin in the said uncured preform has a sufficiently low exothermic heat of reaction in the presence of the said catalytically effective amount of the catalyst whereby the temperature throughout the interior of the said uncured preform does not substantially increase due to the exothermic heat of reaction during the curing thereof.

37. The method of claim 36 wherein the said uncured preform is heated to a temperature not in excess of 150° F. and is thereafter maintained at a temperature not in excess of 150° F. throughout the interior during the curing thereof.

38. The method of claim 30 wherein the liquid resole resin is prepared from phenol per se and formaldehyde.

39. The method of claim 38 wherein the water content of the liquid resole resin is less than 5% by weight.

40. The method of claim 38 wherein the viscosity of the liquid resole resin is about 20,000–100,000 centipoises at a water content of 1% by weight and a temperature of 75° F.

41. The method of claim 38 wherein the volatile blowing agent has a boiling point below the temperature of the said admixture and the admixture is under a superatmospheric pressure which is sufficiently high to maintain the blowing agent in the liquid phase, and the admixture is frothed by quickly releasing the pressure thereon to rapidly volatilize the blowing agent and thereby produce the said uncured froth of the liquid resole resin without requiring heat produced by the exothermic reaction.

42. The method of claim 38 wherein the liquid phenol-aldehyde resin has a mole ratio of aldehyde to phenol of about 2.5:1 and a sufficiently low exothermic heat of reaction in the presence of the said catalytically effective amount of the catalyst whereby the temperature throughout the interior of the said uncured preform does not substantially increase due to the exothermic heat of reaction.

43. The method of claim 42 wherein the said uncured preform is heated to a temperature not in excess of 150° F. and is thereafter maintained at a temperature not in excess of 150° F. throughout the interior during the curing thereof at a pH between about 2.5 and 3.0, the water content of the liquid resole resin is less than 2% by weight, and the viscosity of the liquid resole resin is about 40,000–60,000 centipoises at a water content of 1% by weight and a temperature of 75° F.

* * * * *

UNITED STATES PATENT AND TRADEMARK OFFICE
CERTIFICATE OF CORRECTION

PATENT NO. : 4,303,758

DATED : December 1, 1981

INVENTOR(S) : FREDERICK EMIL GUSMER

It is certified that error appears in the above-identified patent and that said Letters Patent are hereby corrected as shown below:

Col. 11, L 67, Change "5/8" to -- 3/8 --.
Col. 12, L 25 and 26 in both occurrences Change "phenolaldehyde" to -- phenol-aldehyde --.
Col. 13, L 35, Cancel "said solid".
Col. 13, L 36, Cancel in its entirety.
Col. 14, L 1, Cancel "1" and substitute -- 24 --.
Col. 14, L 4, Cancel "1" and substitute -- 24 --.
Col. 14, L 10, Cancel "1" and substitute -- 24 --.
Col. 14, L 41, Cancel "2.0:10" and substitute -- 2.0:1.0 --.
Col. 13, L 37, Cancel "180°F. before decreasing the".

Signed and Sealed this

Eighteenth Day of May 1982

[SEAL]

Attest:

GERALD J. MOSSINGHOFF

Attesting Officer

Commissioner of Patents and Trademarks